United States Patent [19]
Lichtenberg et al.

[11] Patent Number: 5,738,953
[45] Date of Patent: Apr. 14, 1998

[54] ALKALINE METAL OXIDE/METAL HYDRIDE BATTERY

[75] Inventors: Frank Lichtenberg, Zeiskam; Uwe Köhler; Klaus Kleinsorgen, both of Kelkheim, all of Germany; Andreas Fölzer, Treibach-Althofen; Alexander Bouvier, Krumpendorf, both of Austria

[73] Assignee: Varta Batterie Aktiengesellschaft, Hanover, Germany

[21] Appl. No.: 626,138

[22] Filed: Apr. 5, 1996

[30] Foreign Application Priority Data

Apr. 6, 1995 [DE] Germany ............ 195 12 841.9

[51] Int. Cl.$^6$ .................... H01M 4/38; C22C 30/02
[52] U.S. Cl. ............... 429/59; 420/581; 420/582; 420/587; 420/900
[58] Field of Search ................. 420/581, 582, 420/587, 900; 429/59

[56] References Cited

U.S. PATENT DOCUMENTS

| | | | |
|---|---|---|---|
| 4,396,576 | 8/1983 | Oswai et al. | 420/587 X |
| 4,605,603 | 8/1986 | Kanda et al. | 429/59 |
| 5,008,164 | 4/1991 | Furukawa et al. | 429/59 |
| 5,219,678 | 6/1993 | Hasebe et al. | 420/900 X |
| 5,512,385 | 4/1996 | Komori et al. | 420/900 X |

FOREIGN PATENT DOCUMENTS

| | | |
|---|---|---|
| 0206776 | 12/1986 | European Pat. Off. . |
| 0271043 | 6/1988 | European Pat. Off. . |
| 0420669 | 4/1991 | European Pat. Off. . |

OTHER PUBLICATIONS

T. Sakai et al., "Hydrogen Storage Alloys for Nickel–Metal Hydride Battery", *Zeitschrift für Physikalische Chemie*, vol. 183, Part I/II, pp. 333–346 (1994).

*Primary Examiner*—Stephen Kalafut
*Attorney, Agent, or Firm*—Weiser and Associates, P.C.

[57] ABSTRACT

As an active material for its negative electrode, a hydrogen storage alloy for a Ni/H battery has the composition

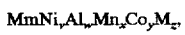

$MmNi_vAl_wMn_xCo_yM_z$, where Mm is a misch metal, M is Fe, Cu, or a mixture of Fe and Cu, and where $0.1 \leq z \leq 0.4$,
$0.2 \leq y \leq 0.4$,
$0.3 \leq w \leq 0.5$,
$0.2 \leq x \leq 0.4$, and
$4.9 \leq v+w+x+y+z \leq 5.1$.

The partial substitution of Co by M, in conjunction with a special production method including the steps of atomizing the molten alloy, followed by heat-treatment and pulverization, leads to an alloy having a particularly high cycle lifetime and discharge capability.

17 Claims, 1 Drawing Sheet

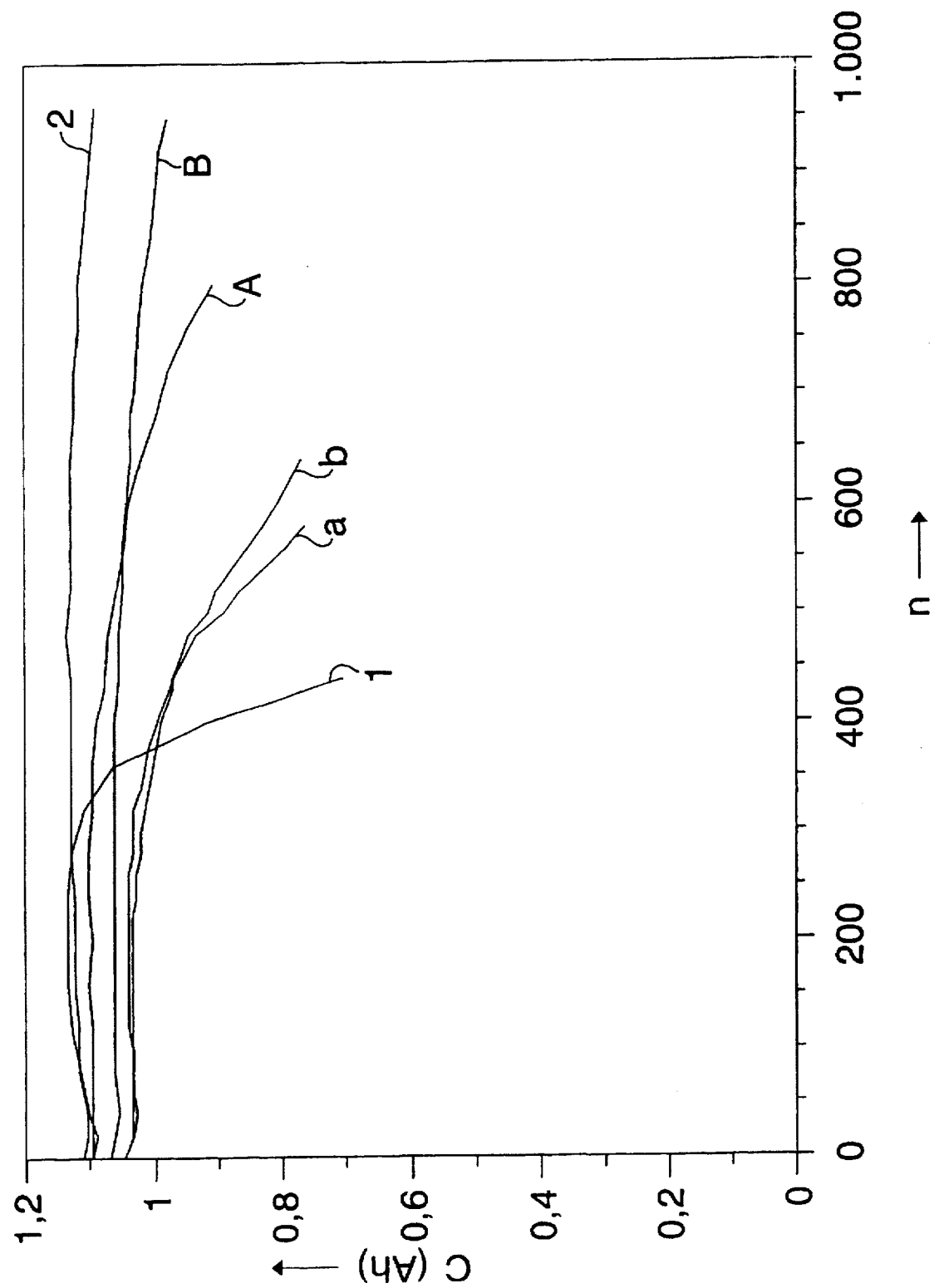

ALKALINE METAL OXIDE/METAL HYDRIDE BATTERY

BACKGROUND OF THE INVENTION

The present invention generally relates to an alkaline metal oxide/metal hydride battery having a positive electrode which contains a metal oxide and a negative electrode which is formed of a hydrogen storage alloy material. More specifically, the present invention relates to a hydrogen storage alloy material for a metal oxide/metal hydride battery which, in addition to a misch metal, includes the elements nickel and cobalt, and which has a $CaCu_5$-type crystalline structure.

Batteries incorporating a rechargeable metal oxide/metal hydride system generally prove superior to conventional storage batteries incorporating lead/acid or nickel/cadmium systems. This superiority is primarily due to the significantly better charge acceptance of a negative hydrogen storage electrode in comparison to that of a negative lead or cadmium electrode.

Hydrogen storage by the active material (M) of a negative metal hydride electrode takes place reversibly, according to the following reactions:

$$M+H_2O+e^- = MH+OH^- \text{ for charging, and}$$

$$MH+OH^- = M+H_2O+e^- \text{ for discharging.}$$

During charging, a hydride (MH) is formed by the charging current, with a decomposition of water. During discharging, hydrogen is liberated and binds to $OH^-$ ions to form water. The simultaneously released electron(s) causes a current to flow in an external circuit associated with the cell.

The corresponding positive electrode for use with a negative hydrogen storage or metal hydride electrode is generally a nickel hydroxide electrode, where the following reversible reactions take place:

$$Ni(OH)_2+OH^- = NiOOH+e^-+H_2O \text{ for charging, and}$$

$$NiOOH+H_2O+e^- = Ni(OH)_2+OH^- \text{ for discharging.}$$

The positive and negative electrodes are separated (by a separator material), and operate in an alkaline electrolyte.

In the many metal oxide/metal hydride batteries which have been developed, particularly those including the generic formulation previously mentioned, the electrochemically active material of the negative electrode is derived from an intermetallic compound, $LaNi_5$, in which both part of the lanthanum and part of the nickel is replaced by other metals which do not reduce the ability to form a metal hydride. For example, a part of the lanthanum can be replaced by other rare-earth metals, and a part of the nickel can be replaced by metals such as cobalt, aluminum, manganese, iron or chromium. In the literature, all of these alloys are assigned (according to the representative, $LaNi_5$) to a so-called "$AB_5$" type, having a $CaCu_5$ structure.

In contrast, other hydrogen storage alloys have titanium and/or zirconium and nickel as essential components, and belong to the so-called "AB" or "$AB_2$" types (e.g., TiNi and $ZrNi_2$).

In the case of alloys derived from $LaNi_5$, the lanthanum is customarily replaced by a so-called "misch metal" (Mm) which contains La, Ce and other rare-earth metals. The substitution of nickel by other metals is usually carried out for the purpose of reducing the equilibrium pressure of hydrogen in the cell.

Several such alloys are known from the patent literature. For example, U.S. Pat. No. 5,008,164 discloses an alloy of a general composition $MmNi_aCo_bMn_c$, where $2.5<a<3.5$. A partial replacement of one of the substituents to form an alloy $MmNi_aCo_bMn_cX_d$ is also possible, where X is selected from the group Fe, Cu, Mo, W, B, Al, Si and Sn, forming a 5-component B-part of the $AB_5$ alloy from the original 4-component B-part. A number of examples of such alloy compositions are also found in EP-A-206,776 (e.g., $MmNi_{3.7}Co_{0.5}Mn_{0.6}Al_{0.2}$) and in EP-B-271,043 (e.g., $MmNi_{3.95}Al_{0.3}Co_{0.75}$). Another known alloy which belongs to this grouping, and which is used in actual practice, has the composition $MmNi_{4.3-y}Co_yAl_{0.4}Mn_{0.3}$ ($0.3 \leq y \leq 0.7$).

A process for preparing a hydrogen storage alloy powder, known as gas atomization, is disclosed in EP 420,669. In this process, argon gas jets discharged from nozzles are directed perpendicular to a pressurized liquid jet of the alloy (that flows out of a melting vessel). This results in atomization of the molten material to form spherical particles. The surfaces of the resulting particles are allowed to cool in a free environment, and are collected at the bottom of a cooling chamber.

While known hydrogen storage alloys with a low cobalt content tend to have a good discharge capability, even at low temperatures, it has been found that a high cycle lifetime can only be achieved with a higher cobalt content. The scarcity and high price of this raw material constitutes a significant disadvantage.

SUMMARY OF THE INVENTION

It is therefore the object of the present invention to provide a modified hydrogen storage alloy material which is derived from the previously described alloy composition, but which is capable of lengthening the cycle lifetime of the cell while containing the lowest possible proportion of cobalt.

This and other objects are achieved in accordance with the present invention by providing a metal oxide/metal hydride battery having a hydrogen storage alloy as an active material of its negative electrode which, in addition to a misch metal, includes the elements nickel and cobalt, and which has a $CaCu_5$-type crystal structure, wherein a part of the cobalt in the alloy is replaced by iron, copper, or a mixture of iron and copper, according to the composition $$MmNi_vAl_wMn_xCo_yM_z,$$

where Mm is the misch metal, M is Fe, Cu, or a mixture of Fe and Cu, and where $0.2 \leq x \leq 0.4$, $0.1 \leq z \leq 0.4$, $0.2 \leq y \leq 0.4$, $0.3 \leq w \leq 0.5$, and $4.9 \leq v+w+x+y+z \leq 5.1$.

For further detail regarding the hydrogen storage alloy of the present invention, reference is made to the detailed description which follows, and the single accompanying figure which illustrates a comparative testing of cells in terms of their discharge capacity.

DETAILED DESCRIPTION OF PREFERRED EMBODIMENTS

An alloy produced in accordance with the present invention has the general composition:

$$MmNi_vAl_wMn_xCo_yM_z.$$

Mm is a misch metal having a lanthanum content of from 25 to 60% by weight, and preferably from 40 to 60% by weight. The remainder of the composition, to 100% by weight, is predominantly Ce. M is one of the metals Cu or Fe, or mixtures thereof. The proportions of the individual components can vary within the following limits:

$0.1 \leq z \leq 0.4$,
$0.2 \leq y \leq 0.4$,
$0.3 \leq w \leq 0.5$,
$0.2 \leq x \leq 0.4$, and
$4.9 \leq v+w+x+y+z \leq 5.1$.

In addition to La, the misch metal contains Ce (more than 25% by weight) as well as Pr and Nd. When Cu and Fe are used, the preferred Cu/Fe ratio is in the range of $0.5 \leq Cu/Fe \leq 2$.

In tests with the alloy $MmNi_{3.8}Al_{0.4}Mn_{0.3}Co_{0.3}M_{0.2}$, with M=Fe, Cu, it has been ascertained that the cycle lifetime of the cell can be considerably increased if an alloy material with the substituents Cu and/or Fe is substituted for part of the cobalt used for the negative electrode, as compared to a conventional hydrogen storage alloy $MmNi_{4.3-y}Co_yAl_{0.4}Mn_{0.3}$ ($0.3 \leq y \leq 0.7$) having the same low cobalt content (i.e., y=0.3). The use of Si, V, Sn or Cr instead of Fe or Cu results in lower capacities or shorter cycle lifetimes.

It is particularly advantageous to produce the alloys of the present invention by the atomization of molten alloys, followed by heat-treatment and pulverization. The heat-treatment is preferably carried out at temperatures of from 700° C. to 900° C., for a period of several hours (e.g., 2 to 4 hours) and under vacuum.

For purposes of electrical testing, size AANi/H cells were used having alloys with compositions according to the present invention as the negative electrodes. Cells for comparison contained negative electrodes made of a conventional alloy. The alloy samples were produced either in the conventional way (i.e., by subjecting a melted alloy to a casting heat-treatment for 12 hours at 1000° C. in a vacuum furnace, pulverizing the heat-treated material, and screening the pulverized material to a particle size of less than 75 μm) or according to the present invention (i.e., by the atomization of a molten alloy, followed by heat-treatment and pulverization). According to their X-ray diffraction patterns, all samples were found to be monophase and to exhibit, exclusively, the typical peaks of a $CaCu_5$ structure.

The resulting alloys were further processed to form negative electrodes by admixing the alloys with carbon and a polytetrafluoroethylene (PTFE) binder, and by rolling the admixed alloys onto a perforated nickel plate. Nickel foam electrodes obtained by pasting nickel hydroxide into a nickel foam frame were used as the corresponding positive electrodes. The paste was composed of 90% spherical nickel hydroxide, with the remainder being CoO, a binder (PTFE) and water.

The separators used were commercially available types made, for example, of a polyamide nonwoven material. The electrolyte was a 6.5 molar KOH and 0.5 molar LiOH solution, in a proportion of 2.1 ml/cell.

At the start of their actual cycling, all of the cells were first conditioned ("run in"). To this end, the cells were initially subjected to a single cycle including charging for 15 hours with 0.1 C (i.e., a current in amperes which is 0.1 times the value of the rated capacity of the cell), followed by storage for 24 hours at 60° C. and discharging with 0.2 C to a final voltage of 1 V. The cells were then subjected to three cycles including charging for 7 hours with 0.2 C, followed by waiting for 0.25 hours and discharging with 0.2 C to a final voltage of 0.9 V.

The results of such cycle testing are given in an accompanying figure which shows discharging capacity C (Ah) as a function of cycle number (n). Curve 1 relates to a conventional alloy with a cobalt content, $Co_{0.3}$. Curve 2 relates to another conventional alloy, with a cobalt content, $Co_{0.7}$, having a cycle life which is clearly very good. However, this is obtained at the expense of using a correspondingly large amount of cobalt.

Alloys a (with M=Cu) and b (with M=Fe) were produced according to the present invention, and are clearly superior to the known alloy (Curve 1) with regard to cycle life. It is further possible for the alloys of the present invention to have cycle lifetimes which approach even the conventional, cobalt-rich alloy of Curve 2, despite a low cobalt content. This was achieved by using a gas atomization process to produce such alloys. To this end, the alloys of the present invention were subjected to processing steps including melting of the starting materials, followed by atomization, screening of the resulting spherical particles (<125 μm screen), heat-treating the screened spherical particles for 3 hours at 800° C. in a vacuum furnace, and pulverizing the heat-treated spherical particles. Curves A (M=Cu) and B (M=Fe) relate to the alloys produced according to this particularly advantageous production method.

Both the atomization and the subsequent heat-treatment and pulverization steps contribute considerably to the capacity and cycle lifetime of the cells. As a result of such treatment, the cycle lifetime is considerably higher than the cycle lifetime of the more conventionally produced samples (Curves a and b).

The special nature of alloys produced in accordance with the present invention (by atomization, followed by heat-treatment and pulverization) resides in the fact that the powder particles are spherically shaped and, under scanning electron microscopy (SEM), exhibit a cell-type substructure. The substructures are separated from one another by boundary regions. These boundary regions, which constitute up to approximately 20% by volume of the particle, differ significantly in chemical composition (and probably also in crystallographic ordering) from the substructures. It is suspected that the boundary regions have a low hydrogen storage capacity. The suspected effect of the heat-treatment is to decompose these boundary regions to some extent, by diffusion processes. This is suspected to be the reason for the increase in capacity which results. The suspected effect of pulverization is that the spherical particles are broken up. As a result, it is suspected that the electrode particles exhibit better electrical contact with one another, in turn yielding a more efficient use of material, and therefore, a further increase in capacity.

The primary advantage of the present invention is the ability to replace cobalt, which is relatively expensive, with copper and/or iron. Ni/H cells equipped with such negative electrode materials can achieve virtually the same cycle lifetime (approximately 1000 cycles) as cells with conventional alloys, having a cobalt content which is approximately twice as great. With conventional alloys which contain approximately the same (low) quantity of cobalt as the alloys of the present invention, it is only possible to achieve cycle lifetimes of approximately 400 cycles. This is insufficient for commercial applications.

The practical requirements for loading capacity (of the cells) are fully satisfied by the conventional alloys, even with a low cobalt content. The alloys of the present invention are no less satisfactory in this regard (i.e., a partial substitution of Co by Cu or Fe does not lead to a loss in capacity at higher loading). The measurement of discharge capacities under different loading levels from 1 C to 5 C has shown that the resulting capacities are actually approximately 10% higher for the higher loading levels (i.e., around 3 C) than the capacities which are achieved with conventional alloys. The alloys of the present invention exhibit a capacity behavior which has a less sensitive reaction to loading changes. Other properties such as self-discharge and pressure behavior are also not detrimentally affected as compared to the conventional alloys.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A hydrogen storage alloy material for a negative electrode of an alkaline metal oxide/metal hydride battery, comprising a misch metal, nickel and cobalt, and which has a $CaCu_5$-type crystal structure, having a composition:

$$MmNi_vAl_wMn_xCo_yM_z,$$

where Mm is the misch metal, M is iron, copper, or a mixture of iron and copper, and where $0.2 \leq x \leq 0.4$;

$0.1 \leq z \leq 0.4$;

$0.2 \leq y \leq 0.4$;

$0.3 \leq w \leq 0.5$; and, $4.9 \leq v+w+x+y+z \leq 5.1$.

2. The hydrogen storage alloy material of claim 1 wherein the misch metal includes La in an amount of from 25 to 60% by weight, and a remainder, of predominantly Ce.

3. The hydrogen storage alloy material of claim 2 wherein the amount of La is from 40 to 60% by weight.

4. The hydrogen storage alloy material of claim 2 wherein the remainder additionally includes other rare-earth metals.

5. The hydrogen storage alloy material of claim 1 wherein M is the mixture of iron and copper, and wherein the iron and copper are mixed in a Cu/Fe ratio in a range of $0.5 \leq Cu/Fe \leq 2$.

6. A process for producing the hydrogen storage alloy material of claim 1, comprising the steps of atomizing the hydrogen storage alloy material while in a molten state, screening the atomized alloy material, heat-treating said material and pulverizing the heat-treated alloy material.

7. The process of claim 6 wherein the heat-treating step is performed for 2 to 4 hours at 700° C. to 900° C. and under vacuum.

8. The process of claim 6 wherein the screening step is performed to a particle size of less than 125 μm.

9. The process of claim 6 which further includes the steps of mixing carbon and a binder with the pulverized alloy material and applying the mixture to an electrode support.

10. A negative electrode for an alkaline metal oxide/metal hydride battery, comprising a hydrogen storage alloy material formed as a misch metal, nickel and cobalt and which has a $CaCu_5$-type crystal structure, having a composition:

$$MmNi_vAl_wMn_xCo_yM_z,$$

where Mm is the misch metal, M is iron, copper, or a mixture of iron and copper, and where $0.2 \leq x \leq 0.4$;

$0.1 \leq z \leq 0.4$;

$0.2 \leq y \leq 0.4$;

$0.3 \leq w \leq 0.5$; and, $4.9 \leq v+w+x+y+z \leq 5.1$.

11. The negative electrode of claim 10 wherein the misch metal includes La in an amount of from 25 to 60% by weight, and a remainder, of predominantly Ce.

12. The negative electrode of claim 11 wherein the amount of La is from 40 to 60% by weight.

13. The negative electrode of claim 11 wherein the remainder additionally includes other rare-earth metals.

14. The negative electrode of claim 10 wherein M is the mixture of iron and copper, and wherein the iron and copper are mixed in a Cu/Fe ratio in a range of $0.5 \leq Cu/Fe \leq 2$.

15. An alkaline metal oxide/metal hydride battery which comprises the negative electrode of claim 10.

16. The alkaline metal oxide/metal hydride battery of claim 15 wherein the positive electrode is a nickel hydroxide electrode.

17. The alkaline metal oxide/metal hydride battery of claim 16 wherein the nickel hydroxide electrode has a foamed-metal electrode structure.

* * * * *

UNITED STATES PATENT AND TRADEMARK OFFICE
CERTIFICATE OF CORRECTION

PATENT NO. : 5,738,953
DATED : April 14, 1998
INVENTOR(S) : Lichtenberg, et. al.

It is certified that error appears in the above-identified patent and that said Letters Patent is hereby corrected as shown below:

Title page, item [73], Assignee:  should read as following:

Varta Batterie Aktiengesellschaft
  Hannover, Germany
  Treibacher Auermet Produktionsges.m.b.H.
    Treibacher Auermet, Austria Signed and Sealed this Twenty-fourth Day of August, 1999

Attest:

Q. TODD DICKINSON

*Attesting Officer*          *Acting Commissioner of Patents and Trademarks*